United States Patent
Race (10) Patent No.: US 9,334,753 B2
(45) Date of Patent: May 10, 2016

(54) CONTROL SYSTEM AND METHODS FOR CONTROLLING THE OPERATION OF POWER GENERATION SYSTEMS

(75) Inventor: Nathan Stafford Race, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 927 days.

(21) Appl. No.: 13/271,934

(22) Filed: Oct. 12, 2011

(65) Prior Publication Data

US 2013/0091856 A1    Apr. 18, 2013

(51) Int. Cl.
  *F01D 25/12*   (2006.01)
  *F01D 5/08*   (2006.01)
  *F02C 7/16*   (2006.01)

(52) U.S. Cl.
  CPC ..... *F01D 25/12* (2013.01); *F01D 5/08* (2013.01); *F01D 5/081* (2013.01); *F01D 5/082* (2013.01); *F02C 7/16* (2013.01); *F05D 2260/2322* (2013.01); *Y02E 20/16* (2013.01); *Y02T 50/676* (2013.01)

(58) Field of Classification Search
  CPC ......... F01D 5/081; F01D 5/082; F01D 25/12; F01D 2260/2322; F01D 5/08; F02C 7/16; Y02T 50/676; Y02T 20/16
  USPC .............................. 60/806, 803, 39.3, 39.182
  See application file for complete search history.

(56) References Cited

U.S. PATENT DOCUMENTS

| | | | |
|---|---|---|---|
| 4,031,404 A | 6/1977 | Martz et al. | |
| 4,117,669 A | 10/1978 | Heller | |
| 4,424,668 A * | 1/1984 | Mukherjee | ................. 60/39.182 |
| 4,571,935 A | 2/1986 | Rice | |
| 5,318,404 A | 6/1994 | Carreno et al. | |
| 5,340,274 A * | 8/1994 | Cunha | ............................ 415/115 |
| 5,579,631 A * | 12/1996 | Chen et al. | ....................... 60/775 |
| 5,593,274 A | 1/1997 | Carreno et al. | |
| 6,065,282 A * | 5/2000 | Fukue et al. | ................ 60/39.182 |
| 6,094,905 A | 8/2000 | Fukuyama | |
| 6,195,979 B1 | 3/2001 | Fukuyama | |
| 6,223,518 B1 | 5/2001 | Wada et al. | |

(Continued)

FOREIGN PATENT DOCUMENTS

| | | |
|---|---|---|
| CN | 101131124 A | 2/2008 |
| CN | 101377303 A | 3/2009 |

(Continued)

OTHER PUBLICATIONS

European Search Report and Opinion issued in connection with corresponding EP Application No. 12187838.3 on Dec. 16, 2015.

(Continued)

*Primary Examiner* — Carlos A Rivera
(74) *Attorney, Agent, or Firm* — Armstrong Teasdale LLP (57) ABSTRACT

A control system is provided. The control system includes at least one sensor positioned within a turbine engine, wherein the sensor is configured to detect at least one first operating parameter within the turbine engine. A controller is coupled to the sensor and the controller is configured to receive at least one second operating parameter of the turbine engine. The controller is also configured to control a flow of a fluid to a rotor assembly within the turbine engine such that the fluid is distributed substantially uniformly within the rotor assembly and at least one of the first operating parameter and the second operating parameter is less than at least one threshold value.

14 Claims, 2 Drawing Sheets

(56) References Cited

U.S. PATENT DOCUMENTS

| | | |
|---|---|---|
| 6,293,088 B1 * | 9/2001 | Moore et al. .................. 60/39.3 |
| 6,298,657 B1 | 10/2001 | Kataoka et al. |
| 6,324,829 B1 * | 12/2001 | Kita et al. .................. 60/39.182 |
| 6,339,926 B1 | 1/2002 | Ichiro et al. |
| 6,502,403 B1 * | 1/2003 | Tazaki et al. .................. 60/784 |
| 6,526,358 B1 | 2/2003 | Mathews, Jr. et al. |
| 6,546,713 B1 * | 4/2003 | Hidaka et al. .............. 60/39.182 |
| 6,772,581 B2 * | 8/2004 | Ojiro et al. ................. 60/39.182 |
| 7,681,401 B2 | 3/2010 | Ziminsky et al. |
| 7,891,192 B2 | 2/2011 | Myers et al. |
| 8,061,971 B2 | 11/2011 | Roush et al. |
| 8,126,629 B2 | 2/2012 | Buchalter et al. |
| 8,677,761 B2 | 3/2014 | Leach et al. |
| 2011/0072814 A1 | 3/2011 | Tice |
| 2013/0091856 A1 | 4/2013 | Race |

FOREIGN PATENT DOCUMENTS

| | | |
|---|---|---|
| CN | 101566105 A | 10/2009 |
| EP | 0231952 A2 | 8/1987 |
| EP | 0965726 A1 | 12/1999 |
| EP | 2138726 A2 | 12/2009 |
| EP | 2305982 A1 | 4/2011 |

OTHER PUBLICATIONS

Unofficial English Translation of Chinese Office Action issued in connection with corresponding CN Application No. 201210385412.2 on Jul. 2, 2015.

* cited by examiner

CONTROL SYSTEM AND METHODS FOR CONTROLLING THE OPERATION OF POWER GENERATION SYSTEMS

BACKGROUND OF THE INVENTION

The field of the invention relates generally to power generation systems and, more particularly, to control systems and methods for use in controlling the operation of power generation systems.

At least some known power generation systems include turbine engines, such as gas turbine engines, that include rotor assemblies. At least some known rotor assemblies include a rotor shaft, at least one rotor disk coupled to the rotor shaft, and a plurality of circumferentially-spaced blades or buckets that are coupled to each rotor disk. Each blade or bucket includes an airfoil that extends radially outward from a platform towards a casing.

During operation of at least some known gas turbine engines, the compressor compresses air, which is mixed with fuel and channeled to the combustor. The mixture is then ignited generating hot combustion gases that are then channeled to the turbine. The turbine extracts energy from the combustion gases for powering the compressor, as well as producing useful work to power a load, such as an electrical generator, or to propel an aircraft in flight. However, continued exposure to high temperatures may cause damage to such components, such as inducing corrosion on the surfaces of the components and/or causing heat-related cracking of the components. Continued operation with a worn or damaged component may cause additional damage to other components and/or may lead to a failure of other components of the turbine engine. In order to maintain temperature levels within, for example, the rotor assembly, compressor extraction flow may be channeled throughout the rotor assembly. Such flow, however, may dilute the hot turbine gases that would have otherwise expanded to produce more work for the turbine engine. Accordingly, the power output for the turbine engine may be reduced.

BRIEF DESCRIPTION OF THE INVENTION

In one embodiment, a control system is provided. The control system includes at least one sensor positioned within a turbine engine, wherein the sensor is configured to detect at least one first operating parameter within the turbine engine. A controller is coupled to the sensor and the controller is configured to receive at least one second operating parameter of the turbine engine. The controller is also configured to control a flow of a fluid to a rotor assembly within the turbine engine such that the fluid is distributed substantially uniformly within the rotor assembly and at least one of the first operating parameter and the second operating parameter is less than at least one threshold value.

In another embodiment, a power generation system is provided. The power generation system includes at least one fluid generating system. At least one turbine engine that includes a rotor assembly is coupled to the fluid generating system via at least one conduit. At least one control valve is coupled to the conduit. At least one control system is coupled to the turbine engine and to the control valve. The control system includes at least one sensor positioned within the turbine engine, wherein the sensor is configured to detect at least one first operating parameter within the turbine engine. A controller is coupled to the sensor and the controller is configured to receive at least one second operating parameter of the turbine engine. The controller is also configured to control a flow of a fluid to the rotor assembly such that the fluid is distributed substantially uniformly within the rotor assembly and at least one of the first operating parameter and the second operating parameter is less than at least one threshold value.

In yet another embodiment, a method for controlling the operation of a power generation system is provided. At least one sensor is positioned within a turbine engine. At least one first operating parameter is detected within the turbine engine via the sensor. At least one second operating parameter of the turbine engine is received via a controller. A flow of a fluid is controlled, via the controller, to a rotor assembly within the turbine engine such that the fluid is distributed substantially uniformly within the rotor assembly and at least one of the first operating parameter and the second operating parameter is less than at least one threshold value.

DETAILED DESCRIPTION OF THE INVENTION

The exemplary methods and systems described herein provide a control system that enables the maintenance of operating parameters, such as temperature, within a turbine engine. The control system includes at least one sensor positioned within a turbine engine, wherein the sensor is configured to detect at least one first operating parameter within the turbine engine. A controller is coupled to the sensor and the controller is configured to receive at least one second operating parameter of the turbine engine. The controller is also configured to control a flow of a fluid to a rotor assembly within the turbine engine such that the fluid is distributed substantially uniformly within the rotor assembly and at least one of the first operating parameter and the second operating parameter is less than at least one threshold value. By controlling the fluid flow that is channeled to the rotor assembly, the operating parameters within the turbine engine may be maintained below threshold values. For example, temperature levels may be at levels such that heat related damage to components within the rotor assembly may be prevented and hot turbine gases may not be readily diluted.

Figure 1:
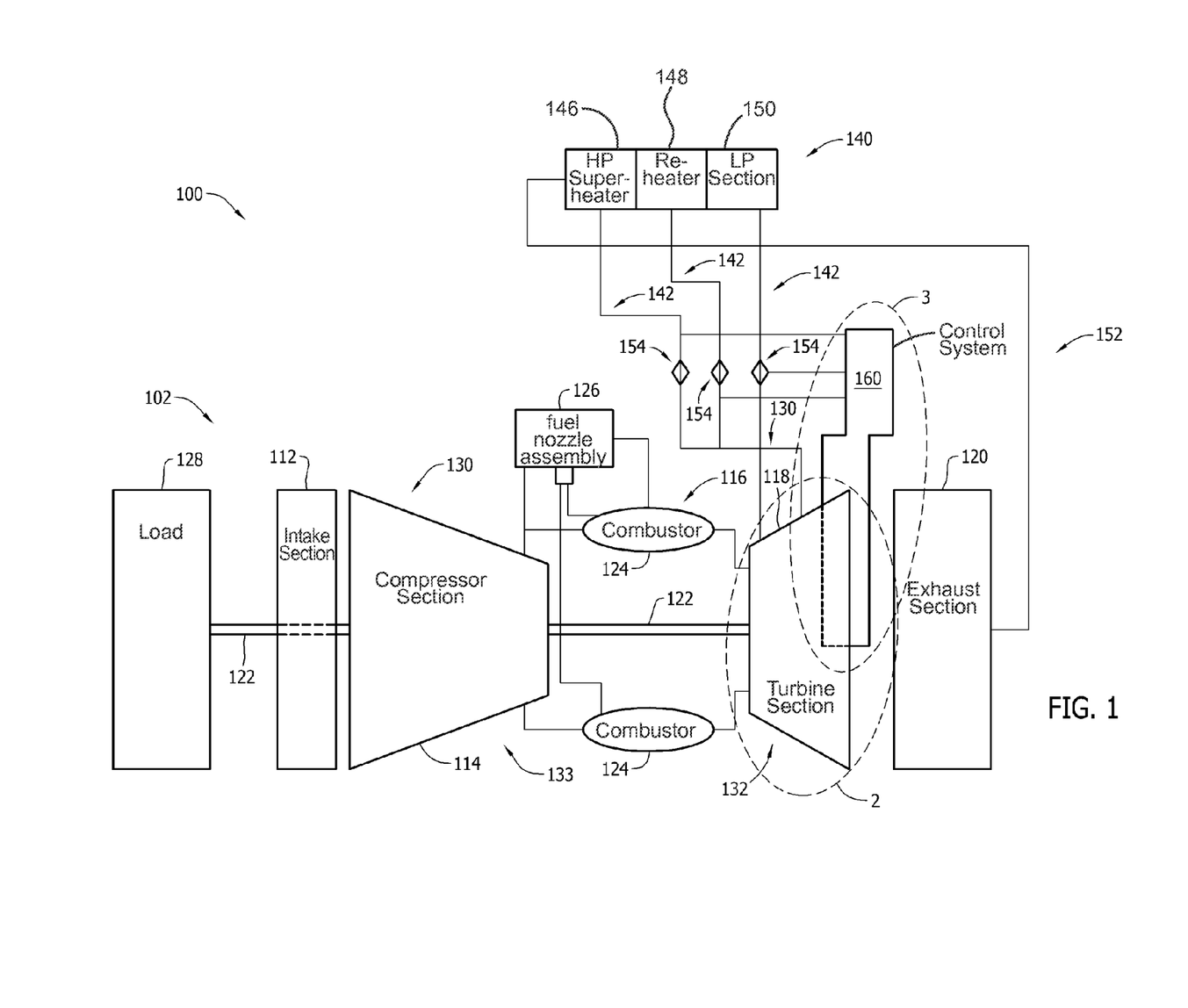
FIG. 1 is a block diagram of an exemplary power generation system.

FIG. 1 is a schematic illustration of an exemplary power generation system 100. More specifically, in the exemplary embodiment, system 100 is a combined-cycle power generation system. Although the exemplary embodiment illustrates a combined-cycle power generation system, the present invention is not limited to combined-cycle power generation systems or other types of power generation systems, and one of ordinary skill in the art will appreciate that the current invention may be used in connection with any type of system.

In the exemplary embodiment, system 100 includes at least one gas turbine engine 102. Gas turbine engine 102 includes an intake section 112, a compressor section 114 coupled to intake section 112, a combustor section 116 coupled to compressor section 114, a turbine section 118 coupled to combustor section 116, and an exhaust section 120. Turbine section 118 is coupled to compressor section 114 via a rotor shaft 122.

In the exemplary embodiment, combustor section 116 includes a plurality of combustors 124. A fuel nozzle assembly 126 is coupled to each combustor 124. Turbine section 118 is coupled to compressor section 114 and to a load 128 such as, but not limited to, an electrical generator and/or a mechanical drive application. In the exemplary embodiment, each compressor section 114 and turbine section 118 includes at least one rotor disk assembly 130 that is coupled to a rotor shaft 122 to form a rotor assembly 132, wherein rotor assembly 132 includes a plurality of components (not shown in FIG. 1).

At least one fluid generating system 140 is coupled to gas turbine engine 102 via at least one steam conduit 142. Fluid generating system 140 may also be coupled to a steam turbine engine (not shown). In the exemplary embodiment, fluid generating system 140 is a heat recovery steam generator (HRSG) that includes a high pressure (HP) superheater section 146, a reheater/intermediate pressure (RH/IP) section 148, and a low pressure (LP) section 150. Alternatively, fluid generating system 140 may be any other type of system that generates and/or obtains thermal fluid, such as, for example, a carbon dioxide capture facility.

In the exemplary embodiment, HP superheater section 146, RH/IP section 148, and LP section 150 are each coupled to rotor assembly 132 in turbine section 118 via steam conduits 142. While not shown in FIG. 1, HP superheater section 146, RH/IP section 148, and LP section 150 may also be coupled to rotor assembly 132 in compressor section 114 via steam conduits 142. Steam conduits 142 are configured to enable flow communication between each HP superheater section 146, RH/IP section 148, and LP section 150 and rotor assembly 132 in the compressor section 114 and/or turbine section 118. Fluid generating system 140 is also coupled to exhaust section 120 via an exhaust conduit 152 that is configured to enable exhaust gases to be channeled from exhaust section to HP superheater section 146. Each steam conduit 142 has at least one control valve 154 positioned and coupled therein. In the exemplary embodiment, each control valve 154 is a throttling valve. Alternatively, each control valve 154 may be any other type of device that may limit and/or prevent fluid flow within each steam conduit 142 and that enables system 100 to function as described herein.

In the exemplary embodiment, power generation system 100 includes a control system 160 that is coupled to gas turbine engine 102. Control system 160 is configured to detect or receive a plurality of operating parameters of gas turbine engine 102. For example, control system 160 is configured to detect at least one first operating parameter of gas turbine engine 102. Control system 160 may also receive at least one second operating parameter of gas turbine engine 102. The first and second operating parameters may include, for example, a temperature, a change in temperature, a pressure, and/or a change in pressure. Alternatively, control system 160 may detect any other parameters for gas turbine engine 102 that enables system 100 to function as described herein. Control system 160 is also configured to determine at least one threshold value for the various operating parameters of gas turbine engine 102 and to compare, for example, the first and second operating parameters with the respective threshold values.

Control system 160, in the exemplary embodiment, is configured to control a flow of a fluid to rotor assembly 132 such that the fluid is distributed substantially uniformly within rotor assembly 132. Moreover, control system 160, in the exemplary embodiment, is configured to control a flow of a fluid to rotor assembly 132 such that first operating parameter and/or second operating parameter is less than at least one threshold value. For example, in the exemplary embodiment, control system 160 is configured to control a flow of steam from each HP superheater section 146, RH/IP section 148, and LP section 150 to rotor assembly 132 such that the temperature and/or pressure within rotor assembly is less than the threshold temperature and/or pressure values, respectively. Alternatively, control system 160 may control the flow of any other thermal fluid, such as carbon dioxide and/or nitrogen gas, from fluid generating system 140 to rotor assembly 132 that enables system 100 to function as described herein.

Control system 160 is also coupled to each control valve 154. In the exemplary embodiment, control system 160 is configured to operate control valves 154 via operative control features of each valve 154, such as opening or closing valves 154 to facilitate controlling the flow of fluid, such as steam, within conduits 142. In the exemplary embodiment, control system 160 is enabled to facilitate modulations, operative openings, and/or closing features of control valves 154 via features that include, without limitation, receiving permissive inputs, transmitting permissive outputs, and transmitting opening and closing commands.

During operation, fuel is channeled to gas turbine engine 102 and intake section 112 channels air towards compressor section 114 wherein the air is compressed to a higher pressure and temperature prior to being discharged towards combustor section 116. The compressed air is mixed with fuel and ignited to generate combustion gases that are channeled towards turbine section 118. More specifically, in combustors 124, fuel, for example, natural gas and/or fuel oil, is injected into the air flow, and the fuel-air mixture is ignited to generate high temperature combustion gases that are channeled towards turbine section 118. Turbine section 118 converts the thermal energy from the gas stream to mechanical rotational energy, as the combustion gases impart rotational energy to turbine section 118 and to rotor assembly 132. In the exemplary embodiment, exhaust gases from exhaust section 120 are channeled to fluid generating system 140 via exhaust gas conduit 156, wherein steam is generated. More specifically, in the exemplary embodiment, HP superheater section 146 generates steam.

As explained in more detail below, during operation, control system 160 uses fluid, such as steam, to maintain operating parameters within turbine engine 102, such as within rotor assembly 132. In the exemplary embodiment, control system 160 determines at least one threshold value for various operating parameters within turbine engine 102. Control system 160 may also detect and/or receive various operating parameters for turbine engine 102. For example, control system 160 may detect a temperature value from at least one location within rotor assembly 132. Control system 160 may also receive a pressure value from within rotor assembly. Depending on whether the detected temperature and/or pressure values within rotor assembly 132 are greater than, less than, or equal to a corresponding threshold temperature value and/or a threshold pressure value, control system controls the flow of a fluid, such as steam, from each HP superheater section 146, RH/IP section 148, and LP section 150 to rotor assembly 132 such that the temperature and/or pressure within rotor assembly is maintained below corresponding the threshold values. More specifically, in the exemplary embodiment, control system 160 modulates control valves 154 in an open or closed position to facilitate controlling the flow of high pressure steam, intermediate pressure steam, or low pressure steam in conduits 142 to rotor assembly 132. Steam may then be substantially uniformly distributed within rotor assembly 132. More specifically, steam may be channeled through various passages (not shown in FIG. 1) between components (not shown in FIG. 1) of rotor assembly 132. Moreover, while the exemplary embodiment illustrates steam as the fluid being channeled to rotor assembly 132, other fluids, such as carbon dioxide gas and nitrogen gas, may also be channeled to rotor assembly 132.

By controlling the fluid flow that is channeled to rotor assembly 132, the operating parameters within turbine engine 102 may be maintained below threshold values. For example, by controlling the steam flow that is channeled to rotor assembly 132, the temperature and/or pressure therein is maintained at levels such that heat related damage to the components within rotor assembly 132 may be prevented. The use of steam may also prevent the hot turbine gases from being readily diluted.

Figure 2:
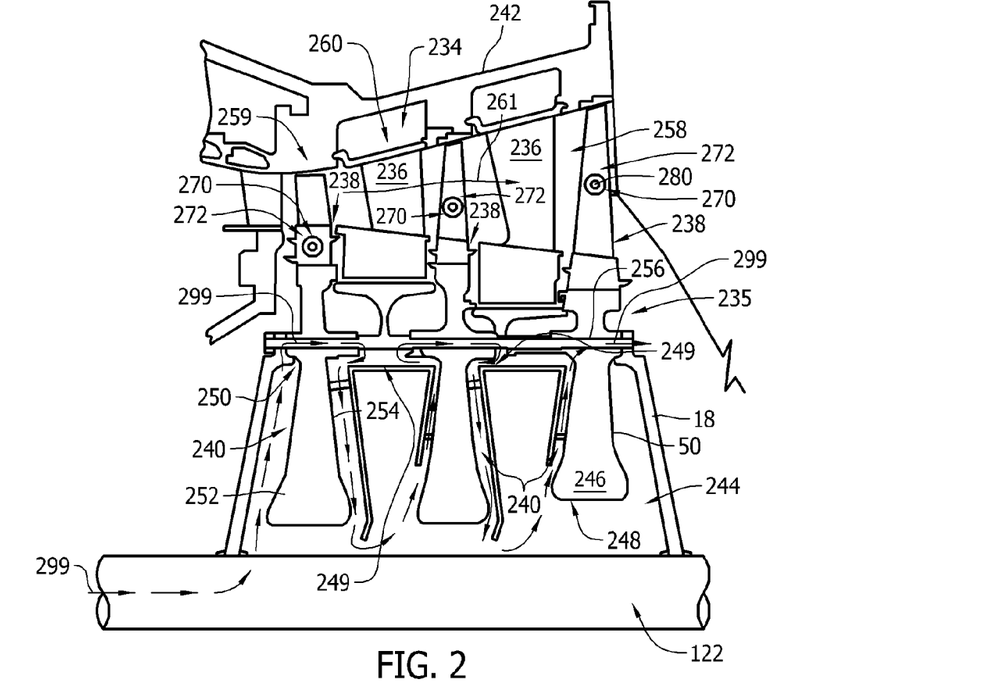
FIG. 2 is a schematic diagram of an exemplary rotor assembly that may be used with the power generation system shown in FIG. 1 and taken along area 2.
Figure 3:
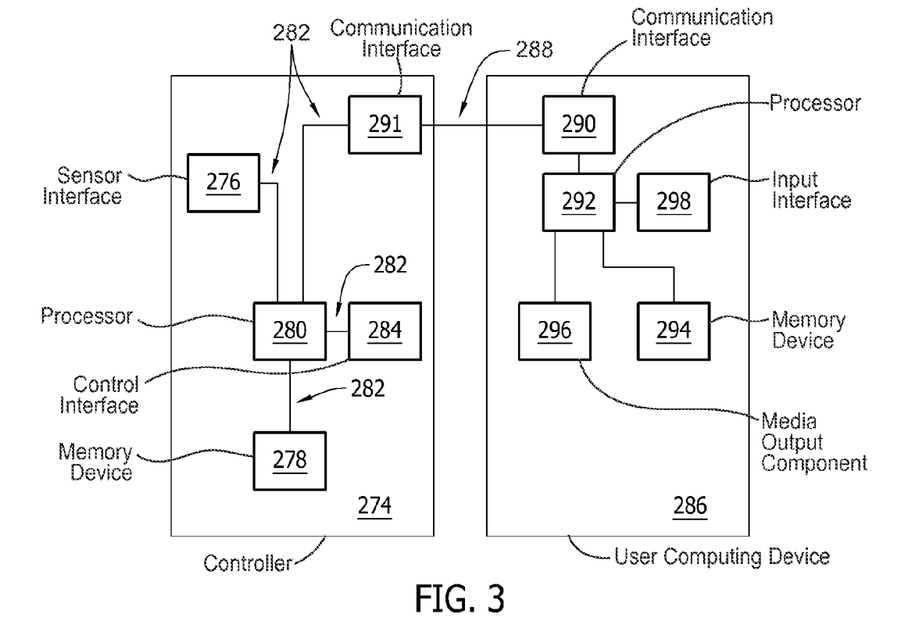
FIG. 3 is a block diagram of a control system that may be used with the power generation system shown in FIG. 1 and taken along area 3.

FIG. 2 illustrates rotor assembly 132 taken along area 2 (shown in FIG. 1). FIG. 3 is a schematic diagram of control system 160 taken along area 3 (shown in FIG. 1). Referring to FIG. 2, in the exemplary embodiment, control system 160 is coupled to various portions of rotor assembly 132 that includes a plurality of stages 234 that each includes a rotating rotor disk assembly 235 and a stationary row of stator vanes 236. In the exemplary embodiment, each rotor disk assembly 235 includes a plurality of turbine blades 238 coupled to a rotor disk 240. Each rotor disk 240 is coupled to rotor shaft 122. A turbine casing 242 extends circumferentially about turbine blades 238 and stator vanes 236, such that each stator vane 236 is supported by casing 242. In the exemplary embodiment, each rotor disk 240 is annular and includes a central bore 244 defined therein that extends substantially axially therethrough. More specifically, each disk body 246 extends radially outwardly from central bore 244.

Moreover, central bore 244 is sized to receive rotor shaft 122 therethrough. Disk body 246 extends radially between a radially inner edge 248 and a radially outer edge 250, and axially from an upstream surface 252 to an opposite downstream surface 254. Each upstream surface 252 and downstream surface 254 extends between inner edge 248 and outer edge 250. An axial support arm 256 is coupled between adjacent rotor disks 240 to form rotor assembly 132.

Moreover, in the exemplary embodiment, each turbine blade 238 is coupled to disk body 246 and extends radially outwardly therefrom. In the exemplary embodiment, turbine blades 238 are spaced circumferentially about rotor disk 240. Adjacent rotor disks 240 are spaced such that a gap 258 is defined between each row 259 of circumferentially-spaced turbine blades 238. Gap 258 is sized to receive a row 260 of circumferentially-spaced stator vanes 236 that each extend inwardly from turbine casing 242 towards rotor shaft 122. More specifically, in the exemplary embodiment, stator vanes 236 are spaced circumferentially about rotor shaft 122 and are oriented to channel combustion gases downstream towards turbine blades 238.

In the exemplary embodiment, a hot gas path 261 is defined between turbine casing 242 and each rotor disk 240. Each row 259 and 260 of turbine blades 238 and stator vanes 236 extends at least partially through a portion of hot gas path 261. Moreover, in the exemplary embodiment, control system 160 includes a plurality of sensors or transducers, such as sensors 270. Each sensor 270 is positioned in close proximity to, and coupled to an exterior surface 272 of at least one turbine blade 238. Alternatively, sensors 270 may be coupled to any other component of turbine engine 102 (shown in FIG. 1) that enables power generation system 100 (shown in FIG. 1) to function as described herein. For example, sensors 270 may be coupled to a surface in compressor section 114 (shown in FIG. 1), combustor section 124 (shown in FIG. 1), exhaust 120 (shown in FIG. 1) and/or on rotor shaft 122. In the exemplary embodiment, sensors 270 each detect various operating parameters of turbine engine 270. More specifically, in the exemplary embodiment, sensors 270 each detect temperatures of the various respective portions of rotor assembly 132 that each sensor 270 is coupled to. Alternatively, sensors 270 may each detect change in temperature, pressure, and/or change in pressure of the various respective portions of rotor assembly 132 that each sensor 270 is coupled to. Alternatively, sensors 270 may detect various other operating parameters that enable control system 160 and/or power generation system 100 (shown in FIG. 1) to function as described herein. Gas turbine engine 102 may also include other sensors (not shown) that may transmit signals of other operating parameters of gas turbine engine 102 to controller 274.

Referring to FIG. 3, in the exemplary embodiment, control system 160 includes a controller 274 that is wirelessly coupled to each sensor 270. More specifically, controller 274 includes a sensor interface 276 and each sensor 270 is coupled to interface 276 via a wireless connection, such as a short-range wireless communication channel such as BLUETOOTH®. BLUETOOTH is a registered trademark of Bluetooth SIG, Inc. of Kirkland, Wash. Various other connections may also be available between sensor interface 276 and sensors 270. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE®) 1394, a parallel data connection, such as IEEE® 1284 or IEEE® 488, and/or a private (e.g., an inaccessible outside power generation system) network connection, whether wired or wireless. IEEE is a registered trademark of the Institute of Electrical and Electronics Engineers, Inc., of New York, N.Y.

In the exemplary embodiment, each sensor 270 transmits a signal corresponding to an operating parameter to controller 274, such as a temperature value detected for the respective portion of turbine blade 238 that each sensor 270 is coupled. Moreover, each sensor 270 may transmit a signal continuously, periodically, or only once, for example. Other signal timings may also be contemplated. Furthermore, each sensor 270 may transmit a signal either in an analog form or in a digital form. The other sensors within gas turbine engine 102 may transmit signals of other operating parameters of gas turbine engine 102 to controller 274.

Further, in the exemplary embodiment, controller 274 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 274 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

In the exemplary embodiment, controller 274 also includes a memory device 278 that stores executable instructions and/or one or more operating parameters representing and/or indicating an operating condition of power generation system 100. For example, in the exemplary embodiment, memory device 278 may store the temperature values that are detected by sensors 270. In the exemplary embodiment, controller 274 also includes a processor 280 that is coupled to memory device 278 and sensor interface 276 via a system bus 282.

In the exemplary embodiment, processor 280 is programmed to determine at least one threshold value for various operating parameters of gas turbine engine 102. For example, processor may be programmed to determine a temperature and/or a pressure threshold value for within rotor assembly 132. Processor 280, for example, may determine a threshold temperature value by calculating an average of the temperature values that are detected by sensors 270. The threshold temperature values may change depending on the various times during the operational state of turbine engine 102 that sensors detect temperature values. Processor 280 may also determine a threshold temperature value based at least in part on at least one operational state of gas turbine engine 102 and the threshold values may change accordingly. For example, rotor assembly 132 may need a lower temperature during a start-up of turbine engine 102 such that internal gradients may be reduced within the components of rotor assembly 132. As such, a low threshold temperature value may be determined. At a steady state for turbine engine 102, a substantially lower temperature may be needed for rotor assembly to enable heat reduction from various flow paths within rotor assembly 132. In such a case, a low threshold temperature value may also be determined. During shut-down of turbine engine 102, it may be desirable to maintain the temperature within rotor assembly 132 at a substantially higher temperature value such that rotor assembly 132 may remain warm to enable efficient start-up of turbine engine 102 at a later time. Accordingly, a high threshold temperature value may be determined. Processor 280 is also programmed to compare the operating parameters detected by sensors 270 with the determined threshold temperature values to determine whether the detected temperature values are greater than, less than, or equal to the threshold temperature value. Processor 280 may also be programmed to receive operating parameters from the other sensors within gas turbine engine 102 and compare those operating parameters with determined threshold values to determine whether the detected temperature values are greater than, less then, or equal to the threshold temperature values.

In one embodiment, processor 280 may include a processing unit, such as, without limitation, an integrated circuit (IC), an application specific integrated circuit (ASIC), a microcomputer, a programmable logic controller (PLC), and/or any other programmable circuit. Alternatively, processor 280 may include multiple processing units (e.g., in a multi-core configuration). The above examples are exemplary only, and thus are not intended to limit in any way the definition and/or meaning of the term "processor."

Moreover, in the exemplary embodiment, controller 274 includes a control interface 284 that controls an operation of power generation system 100. In the exemplary embodiment, control interface 284 is coupled to one or more power generation system control devices, such as control valves 154 (shown in FIG. 1). In the exemplary embodiment, controller 274 processes the signal(s) received by sensors 270 to generate one or more control parameters. Control interface 284 also transmits a control parameter (e.g., open or close) to control valves 154. For example, processor 280 encodes a control parameter in a signal.

Various connections are available between control interface 284 and control valves 154. Such connections may include, without limitation, an electrical conductor, a low-level serial data connection, such as Recommended Standard (RS) 280 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., an inaccessible outside power generation system) network connection, whether wired or wireless.

In the exemplary embodiment, control system 160 also includes a user computing device 286 that is coupled to controller 274 via a network 288. More specifically, user computing device 286 includes a communication interface 290 that is coupled to a communication interface 291 contained within controller 274. User computing device 286 includes a processor 292 for executing instructions. In some embodiments, executable instructions are stored in a memory device 294. Processor 292 may include one or more processing units (e.g., in a multi-core configuration). Memory device 294 is any device allowing information, such as executable instructions and/or other data, to be stored and retrieved.

User computing device 286 also includes at least one media output component 296 for use in presenting information to a user (not shown). Media output component 296 is any component capable of conveying information to the user. Media output component 296 may include, without limitation, a display device (e.g., a liquid crystal display (LCD), an organic light emitting diode (OLED) display, or an audio output device (e.g., a speaker or headphones)).

Moreover, in the exemplary embodiment, user computing device 286 includes an input interface 298 for receiving input from the user. Input interface 298 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 296 and input interface 298.

During operation, fuel is channeled to gas turbine engine 102 such that thermal energy from the gas stream may be converted to mechanical rotational energy by turbine engine 102. Exhaust gases from exhaust section 120 (shown in FIG. 1) are channeled to fluid generating system 140 (shown in FIG. 1) via exhaust gas conduit 156 (shown in FIG. 1), wherein steam is generated.

Control system 160 uses fluid, such as the generated steam, to maintain operating parameters below their respective threshold values. Control system 160 determines at least one threshold value, such as a threshold temperature value, for a component within gas turbine engine 102, such as rotor assembly 132. Control system 160 also detects at least one actual operating parameter within gas turbine engine 102. For example, control system 160 may detect temperature values from at least one location within rotor assembly 132. More specifically, in the exemplary embodiment, each sensor 270 detects a temperature value for a portion of rotor assembly 132 that each sensor 270 is coupled to. Each sensor 270 then transmits a signal representative of the detected temperature values to sensor interface 276. The other sensors within gas turbine engine 102 may also transmit a signal representative of other operating parameters detected within gas turbine engine 102 to sensor interface 276. For example, pressure sensors (not shown) may transmit pressure values detected within rotor assembly 132 to sensor interface 276.

Sensor interface 276 transmits the data to memory device 278 for storage. More specifically, memory device 278 stores the detected operating parameters. In the exemplary embodiment, processor 280 then determines threshold values for the various operating parameters for gas turbine engine 102. For example, in the exemplary embodiment, processor 280 determines at least one threshold temperature value and/or a pressure value. Processor 280 may determine a threshold temperature value by calculating an average of the temperature values that are detected by sensors 270. Processor 280 may determine a threshold pressure value by calculating an average of the pressure values received by sensor interface 276. Processor 280 may also determine threshold values based at least in part on at least one operational state of gas turbine engine 102.

When the threshold temperature values are determined, processor 280 compares the temperature values detected by sensors 270 with the threshold temperature value to determine whether the detected temperature values are greater than, less than, or equal to the threshold temperature value. Similarly, processor 280 may compare the pressure values detected by the other sensors to determine whether the detected pressure values are greater than, less than, or equal to the threshold pressure values. Depending on whether the detected temperature values and/or pressure values are greater than, less than, or equal to the threshold values, control system controls the flow of fluid, such as steam, from each HP superheater section 146 (shown in FIG. 1), RH/IP section 148 (shown in FIG. 1), and LP section 150 (shown in FIG. 1) to rotor assembly 132 such that the temperature and/or pressure within gas turbine engine 102 are maintained below the respective threshold values.

In the exemplary embodiment, control system 160 modulates control valves 154 in an open, a partially open, a partially closed, or a closed position to facilitate controlling the flow of a fluid, such as steam, such that the fluid is distributed uniformly to the components within rotor assembly 132, such as turbine blades 238. In the exemplary embodiment, processor 280 transmits a signal to control interface 284 such that control interface 284 may transmit a control parameter to at least one valve 154. Control interface 284 transmits a signal representative of the function to open or close to valves 154 such that steam flow may be channeled to rotor assembly 132.

In the exemplary embodiment, valves 154 are opened or closed such that the flow rate of steam within conduits 142 (shown in FIG. 1) changes and/or a supply pressure of steam within conduits 142 changes. For example, valves 154 may be controlled from an open position to a partially or completely closed position in order to substantially reduce or prevent the flow rate of steam and/or to substantially reduce or prevent the supply pressure of steam being channeled within conduits 142 to rotor assembly 132. In contrast, valves 154 may be controlled from a closed position to a partially or completely open position to substantially increase the flow rate of steam and/or to substantially increase the supply pressure of steam being channeled within conduits 142 to rotor assembly 132. When steam is channeled to rotor assembly 132, steam enters rotor assembly 132 via conduits 142 and is channeled to one of the rotor disks 240, as shown via arrows 299. Steam may also be channeled around at least one blade 238, as shown via arrows 299. In addition to steam being channeled around blades 238, steam may also be channeled around at least one disk body 246. Steam may also contact disk body 246. Steam may also be channeled into each cavity 249, as shown via arrows 299.

Controller 274 will continue to regulate the flow of steam to rotor assembly 132 based on the detected temperatures and/or other operating parameters received. A user may also manipulate the determined threshold values and/or input different threshold values, and/or manipulate the control functions via computing device 286 to enable power generation system 100 to function appropriately. For example, the user may have a visual display of the determined threshold values via media output component 296. The user may input various command functions via input interface 298. Processor 292 then transmits a signal to communication interface 290. Communication interface 290 transmits the information to controller 274 via network 288. Communication interface 291 receives the information and transmits a signal to processor 280. Processor 280 may then generate new threshold values and/or transmit a signal to control interface 284 such that control interface 284 may transmit a signal representative of the function to open or close to valves 154.

As compared to known systems that use turbine engines to generate power, the embodiments described herein provide a control system that enables the maintenance of operating parameters, such as temperature, within a turbine engine. The control system includes at least one sensor positioned within a turbine engine, wherein the sensor is configured to detect at least one first operating parameter within the turbine engine. A controller is coupled to the sensor and the controller is configured to receive at least one second operating parameter of the turbine engine. The controller is also configured to control a flow of a fluid to a rotor assembly within the turbine engine such that the fluid is distributed substantially uniformly within the rotor assembly and at least one of the first operating parameter and the second operating parameter is less than at least one threshold value. By controlling the fluid flow that is channeled to the rotor assembly, the operating parameters within the turbine engine may be maintained below threshold values. For example, temperature levels may be at levels such that heat related damage to components within the rotor assembly may be prevented and hot turbine gases may not be readily diluted.

A technical effect of the systems and methods described herein includes at least one of: (a) positioning at least one sensor within a turbine engine; (b) detecting, via at least one sensor, at least one first operating parameter within a turbine engine; (c) receiving, via a controller, at least one second operating parameter of a turbine engine; and (d) controlling, via a controller, a flow of a fluid to a rotor assembly within a turbine engine such that the fluid is distributed substantially uniformly within the rotor assembly and at least one of at least one first operating parameter and at least one second operating parameter is less than at least one threshold value.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and are not limited to practice with only the systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system comprising:
   at least one sensor positioned within a turbine engine, wherein said sensor is configured to detect at least one first operating parameter within the turbine engine; and
   a controller coupled to said at least one sensor and to a plurality of control valves, wherein a first of said control valves is operatively coupled in a fluid supply conduit from a high pressure section of a heat recovery steam generator (HRSG), a second of said control valves is operatively coupled in a fluid supply conduit from an intermediate pressure section of the HRSG, and a third of said control valves is operatively coupled in a fluid supply conduit from a low pressure section of the HRSG, said controller is configured to:
      receive at least one second operating parameter of the turbine engine; and
      operate said plurality of control valves based on at least one of the at least one first operating parameter and the at least one second operating parameter to control a flow of a fluid to a rotor assembly within the turbine engine such that at least one of the at least one first operating parameter and the at least one second operating parameter is less than at least one threshold value,
   wherein the rotor assembly includes a plurality of axial stages coupled to a rotor shaft, each axial stage including at least one turbine blade and a disk body, each disk body extending axially from an upstream surface to an opposite downstream surface,
   wherein the fluid is distributed substantially uniformly within the rotor assembly such that the fluid is channeled around the disk body of a forward stage of the plurality of axial stages from the upstream surface of the forward stage through a channel in the disk body of the forward stage defined radially inward of the at least one turbine blade of the forward stage to the opposite downstream surface of the forward stage such that the fluid remains radially inward of the at least one turbine blade of the forward stage,
   wherein the fluid is further channeled around the disk body of an aft stage of the plurality of axial stages from the upstream surface of the aft stage through a channel in the disk body of the aft stage defined radially inward of the at least one turbine blade of the aft stage to the opposite downstream surface of the aft stage such that the fluid remains radially inward of the at least one turbine blade of the aft stage.

2. A control system in accordance with claim 1, wherein said controller is configured to determine the at least one threshold value based at least in part on at least one operational state of the turbine engine.

3. A control system in accordance with claim 1, wherein said controller controls a flow of at least one of carbon dioxide gas, nitrogen gas, and steam to the rotor assembly.

4. A control system in accordance with claim 1, wherein said controller controls the flow of the fluid such that the fluid is channeled into a cavity defined between the forward stage and the aft stage.

5. A control system in accordance with claim 1, wherein said controller controls the flow of the fluid by controlling at least one of a flow rate of the fluid and a supply pressure of the fluid.

6. A power generation system comprising:
   at least one fluid generating system comprising a high pressure section, an intermediate pressure section, and a low pressure section;
   at least one turbine engine comprising a rotor assembly, said rotor assembly comprising a plurality of axial stages coupled to a rotor shaft, each axial stage comprising at least one turbine blade and a disk body, each disk body extending axially from an upstream surface to an opposite downstream surface;
   a plurality of control valves comprising a first control valve operatively coupled in a fluid supply conduit from said high pressure section, a second control valve operatively coupled in a fluid supply conduit from said intermediate pressure section, and a third control valve operatively coupled in a fluid supply conduit from said low pressure section; and
   at least one control system coupled to said at least one turbine engine and to said plurality of control valves, said at least one control system comprising:
      at least one sensor positioned within said at least one turbine engine, wherein said sensor is configured to detect at least one first operating parameter within said at least one turbine engine; and
      a controller coupled to said at least one sensor, said controller is configured to:
         receive at least one second operating parameter of said at least one turbine engine; and
         operate said plurality of control valves based on at least one of the at least one first operating parameter and the at least one second operating parameter to control a flow of a fluid to said rotor assembly such that at least one of the at least one first operating parameter and the at least one second operating parameter is less than at least one threshold value,
      wherein the fluid is distributed substantially uniformly within said rotor assembly such that the fluid is channeled around the disk body of a forward stage of the plurality of axial stages from the upstream surface of the forward stage through a channel in the disk body of the forward stage defined radially inward of the at least one turbine blade of the forward stage to the opposite downstream surface of the forward stage such that the fluid remains radially inward of the at least one turbine blade of the forward stage,
      wherein the fluid is further channeled around the disk body of an aft stage of the plurality of axial stages from the upstream surface of the aft stage through a channel in the disk body of the aft stage defined radially inward of the at least one turbine blade of the aft stage to the opposite downstream surface of the aft stage such that the fluid remains radially inward of the at least one turbine blade of the aft stage.

7. A power generation system in accordance with claim 6, wherein said controller is configured to determine the at least one threshold value based at least in part on at least one operational state of said at least one turbine engine.

8. A power generation system in accordance with claim 6, wherein said controller controls a flow of at least one of carbon dioxide gas, nitrogen gas, and steam to said rotor assembly.

9. A power generation system in accordance with claim 6, wherein said controller controls the flow of the fluid such that the fluid is channeled into a cavity defined between said forward stage and said aft stage.

10. A power generation system in accordance with claim 6, wherein said controller controls the flow of the fluid by controlling at least one of a flow rate of the fluid and a supply pressure of the fluid.

11. A method for controlling the operation of a power generation system, said method comprising:
positioning at least one sensor within a turbine engine;
detecting, via the at least one sensor, at least one first operating parameter within the turbine engine;
receiving, via a controller, at least one second operating parameter of the turbine engine, wherein the controller is coupled to the at least one sensor and to a plurality of control valves, wherein a first of the control valves is operatively coupled in a fluid supply conduit from a high pressure section of a heat recovery steam generator (HRSG), a second of the control valves is operatively coupled in a fluid supply conduit from an intermediate pressure section of the HRSG, and a third of the control valves is operatively coupled in a fluid supply conduit from a low pressure section of the HRSG; and
controlling, via the controller, the plurality of control valves based on at least one of the at least one first operating parameter and the at least one second operating parameter to control a flow of a fluid to a rotor assembly within the turbine engine such that at least one of the at least one first operating parameter and the at least one second operating parameter is less than at least one threshold value,
the rotor assembly including a plurality of axial stages coupled to a rotor shaft, each axial stage including at least one turbine blade and a disk body, each disk body extending axially from an upstream surface to an opposite downstream surface,
wherein the fluid is distributed substantially uniformly within the rotor assembly such that the fluid is channeled around the disk body of a forward stage of the plurality of axial stages from the upstream surface of the forward stage through a channel in the disk body of the forward stage defined radially inward of the at least one turbine blade of the forward stage to the opposite downstream surface of the forward stage such that the fluid remains radially inward of the at least one turbine blade of the forward stage,
wherein the fluid is further channeled around the disk body of an aft stage of the plurality of axial stages from the upstream surface of the aft stage through a channel in the disk body of the aft stage defined radially inward of the at least one turbine blade of the aft stage to the opposite downstream surface of the aft stage such that the fluid remains radially inward of the at least one turbine blade of the aft stage.

12. A method in accordance with claim 11, further comprising determining the at least one threshold value based at least in part on at least one operational state of the turbine engine.

13. A method in accordance with claim 11, wherein controlling, via the controller, a flow of a fluid further comprises controlling, via the controller, a flow of at least one of carbon dioxide gas, nitrogen gas, and steam to the rotor assembly.

14. A method in accordance with claim 11, wherein controlling, via the controller, a flow of a fluid further comprises controlling, via the controller, a flow of a fluid by controlling at least one of a flow rate of the fluid and a supply pressure of the fluid.

* * * * *